(12) United States Patent
Narsinh et al.

(10) Patent No.: US 7,698,412 B2
(45) Date of Patent: *Apr. 13, 2010

(54) PARALLEL DATA LINK LAYER CONTROLLERS IN A NETWORK SWITCHING DEVICE

(75) Inventors: Anees Narsinh, Pacific Palisades, CA (US); John Bailey, Agoura Hills, CA (US)

(73) Assignee: Alcatel Lucent, Paris (FR)

(*) Notice: Subject to any disclaimer, the term of this patent is extended or adjusted under 35 U.S.C. 154(b) by 1113 days.

This patent is subject to a terminal disclaimer.

(21) Appl. No.: 10/751,129

(22) Filed: Dec. 31, 2003

(65) Prior Publication Data

US 2005/0198258 A1 Sep. 8, 2005

(51) Int. Cl.
*G06F 15/173* (2006.01)
(52) U.S. Cl. .................. 709/224; 709/232; 709/239; 370/230; 370/235
(58) Field of Classification Search ............. 709/232, 709/224, 226, 239; 370/392, 389, 230, 235
See application file for complete search history.

(56) References Cited

U.S. PATENT DOCUMENTS

| | | | |
|---|---|---|---|
| 6,181,699 B1 * | 1/2001 | Crinion et al. .............. 370/392 |
| 6,389,468 B1 * | 5/2002 | Muller et al. ............... 709/226 |
| 6,681,262 B1 * | 1/2004 | Rimmer ...................... 709/250 |
| 6,940,814 B1 * | 9/2005 | Hoffman .................... 370/235 |
| 7,161,904 B2 * | 1/2007 | Hussain et al. ............. 370/230 |
| 2002/0089929 A1 * | 7/2002 | Tallegas et al. ............. 370/230 |
| 2003/0061623 A1 * | 3/2003 | Denney et al. .............. 725/125 |
| 2005/0198258 A1 * | 9/2005 | Narsinh et al. .............. 709/224 |

FOREIGN PATENT DOCUMENTS

| | | |
|---|---|---|
| WO | WO 00/10297 A1 | 2/2000 |
| WO | WO 02/17571 A1 | 2/2002 |

* cited by examiner

*Primary Examiner*—George C Neurauter, Jr.
*Assistant Examiner*—Kyung H Shin
(74) *Attorney, Agent, or Firm*—Raymond M. Galasso; Galasso & Associates, L.P.

(57) ABSTRACT

The present invention features a data link layer processor for performing VLAN tagging operations, policing, shaping, and statistics acquisition integrally with one or more media access controllers (MACs). When a plurality of data link layer processors are operated in parallel in a switching device, the computational burden carried by the route engine is significantly reduced. Moreover, the data link layer processor in its several embodiments may be used to introduce various forms of pre-processing and post-processing into network switching systems that employ route engines that do not posses such functionality.

18 Claims, 5 Drawing Sheets

US 7,698,412 B2

PARALLEL DATA LINK LAYER CONTROLLERS IN A NETWORK SWITCHING DEVICE

FIELD OF INVENTION

The invention generally relates to technique for processing frames in a network switch. In particular, the invention relates to a system and method for providing distributed VLAN association, policing, shaping, and statistics acquisition in a plurality of data link layer controllers of the network switch.

BACKGROUND

Routers in packet switched networks generally employ one or more network processors, typically an application-specific integrated circuit (ASICs), to perform various packet processing operations. Each network processor is generally associated with a plurality of media access controllers from which frames are received and to which frames are transmitted. Historically, the routers were designed so that the network processor could simultaneously accommodate traffic from each of the associated ports being operated at its designated wire speed, typically 100 or 1000 megabits/sec. There is, however, a trend to over-subscribed ports, meaning that the bandwidth of the network processor or other router resources is generally unable to support each of the ports operating at wire speed for a sustained period of time. While the per-port cost savings for an over-subscribed system provides a beneficial tradeoff for some customers, oversubscribing ports may lead to some loss of data as a result of the inability of the network processor or route processor to handle the traffic.

In order to minimize the detrimental effects of over-subscription, routers may employ extensive buffering in an attempt to capture bursts of traffic until the resources are available to processes the traffic. Pause messages may also be transmitted to one or more link partners to temporarily reduce the amount of data received and thereby reduce the chance of buffer overflow. Despite limited success, both of these approaches fail to address the underlying inability of the network processor or other resources to handle large volumes of traffic. There is therefore a need for a means of maintaining the advantages of oversubscribed port configurations while reducing the computational demands on the network processor.

SUMMARY

The present invention features a data link layer processor for accumulating statistics integrally with one or more media access controllers (MACs). When a plurality of data link layer processors are operated in parallel in a switching device, the computational burden carried by the network processor is significantly reduced. Moreover, the data link layer processor in its several embodiments may be used to introduce statistics acquisition capability into systems that employ network processors that do not posses such functionality. Providing statistics on a per VLAN basis, for example, is of particular interest in applications where accounting and billing is preferably performed on the basis of the VLAN with which the traffic is sent.

The data link layer processor in some embodiments comprises one or more MACs for receiving a frame from a communication network, and a statistics acquisition module, operatively coupled to the one or more MACs, for compiling statistics associated with each of the plurality of MACs. In the preferred embodiment, the statistics generated on the ingress flow compiled as a function of VLAN entry include the number of bytes enqueued at the data link layer processor, the number of frames enqueued at the data link layer processor, the number of non-unicast bytes enqueued at the data link layer processor, and the number of non-unicast frames enqueued at the data link layer processor. In the preferred embodiment, there are two statistics generated on the egress per-VLAN entry, namely the number of dequeued bytes and the number of dequeued frames.

BRIEF DESCRIPTION OF THE DRAWINGS

The present invention is illustrated by way of example and not limitation in the figures of the accompanying drawings, and in which.

DETAILED DESCRIPTION

Figure 1:
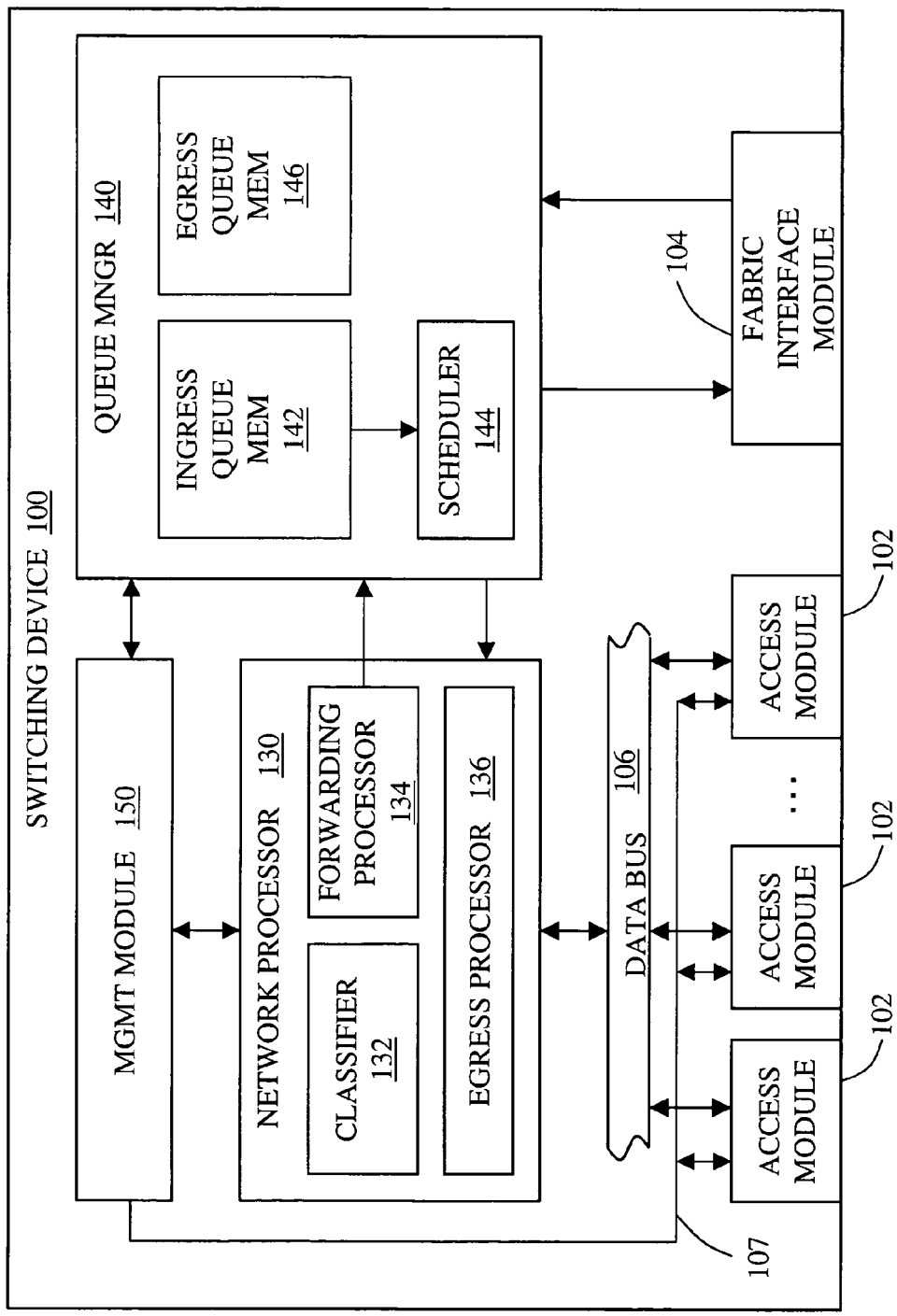
FIG. 1 is a functional block diagram of network switching device, in accordance with the preferred embodiment of the present invention.

Illustrated in FIG. 1 is a functional block diagram of network switching device with which the preferred embodiment may be implemented. The switching device 100 in the preferred embodiment is adapted to perform switching and routing operations with protocol data units (PDUs) at layer 2 (Data Link Layer) and layer 3 (Network Layer) as defined in the Open Systems Interconnect (OSI) reference model. The switching device 100 is preferably one of a plurality of switching devices operatively coupled to one another via a common switch fabric (not shown). The switching devices are, in turn, operatively coupled to a plurality of nodes in a data communications network embodied in a local area network (LAN), wide area network (WAN), metropolitan area network (MAN), or a combination thereof, for example.

The switching device 100 of the preferred embodiment generally comprises a network processor 130, e.g., a route processor, a queue or traffic manager 140, and a management module 150. The network processor 130 is operatively coupled to the network via a plurality of network access modules (AMs) 102, each of the AMs 102 including at least one external port operatively coupled to a communications link for purposes of receiving ingress data traffic and transmitting egress data traffic. As used herein, traffic entering the switching device 100 at the AMs 102 is referred to as ingress traffic while traffic exiting at an AM 102 is referred to as egress traffic. The AM 102 ports include Data Link Layer ports such as Ethernet media access control (MAC) interfaces enabled with Institute of Electrical and Electronics Engineers (IEEE) standard 802.3, for example.

The PDUs of the ingress and egress traffic are conveyed between the plurality of AMs 102 and network processor 130 via one or more internal data buses 106. The network processor 130 of the preferred embodiment comprises a classifier 132 and a forwarding processor 134, and an egress processor 136. The classifier 132 generally parses ingress PDUs; extracts one or more fields of the PDU including source and/or destination addresses, protocol types, and priority information; and maps the PDU to one of a set of flow categories based upon local policies defined by a network administrator via the management module 150. The local policies prescribe the class of service (CoS) and or quality of service (QoS) to be applied the PDU.

The forwarding processor 134 then prepares the ingress PDU for transmission using address information compiled by the switching device 100. If the destination physical address of the PDU is matched in the MAC address tables, the appropriate output port is identified and the frame is switched to the egress port of the appropriate egress switching device. If, however, the PDU includes a destination network address of a node in another network domain, the forwarding processor searches known Internet Protocol (IP) addresses and other flow information in a forwarding table retained in a central Content Addressable Memory (cCAM), for example; retrieves, if a match occurs, the next-hop MAC address of an adjacent device to which the packet is to be forwarded; and encapsulates the packet in a new layer 2 header. The PDUs of the ingress flow are then passed from the network processor 130 to the queue manager 140 where they are buffered prior to transmission to the switch fabric (not shown) via the fabric interface module 104.

In addition to the ingress processing described above, the network processor 130 also processes egress traffic received from the switch fabric. In support of this egress traffic, the network processor 130 further includes an egress processor 136 that receives egress traffic from the egress queue memory 146 or fabric interface module 104 that may be temporarily buffered prior to being passed to the designated egress port among the AMs 102.

The queue manager 140 comprises at least one ingress queue memory 142 and queue scheduler 144. The ingress queue memory 142 includes a plurality of packet buffers or queues, each of which is associated with a different priority level or a different level of QoS/CoS. When output bandwidth is available, a buffered PDU is transmitted by the scheduler 144 to the switch fabric via the fabric interface module 104.

Figure 2:
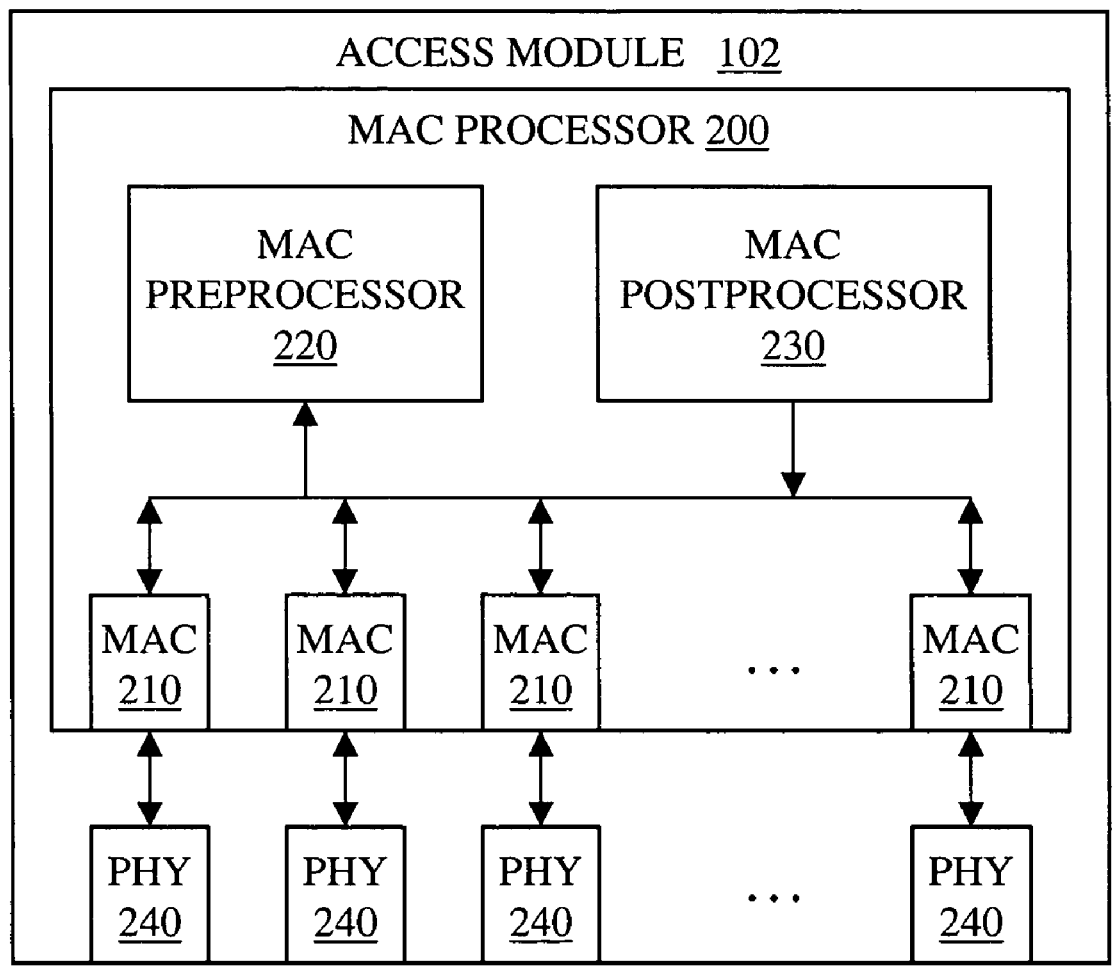
FIG. 2 is a functional block diagram of an access module, in accordance with the preferred embodiment of the present invention.

Illustrated in FIG. 2 is a functional block diagram of an AM 102, in accordance with the preferred embodiment. The AM 102 generally comprises a plurality of physical layer interfaces (PHY) 240 and a MAC processor 200. Each of the PHYs 240 operating at layer 1 (Physical Layer) defined in the OSI reference model performs conventional network interface functions including the reception and transmission of Ethernet symbol streams. When receiving a symbol stream from the associated communications link, electrical or optical signals from the communications link are converted by the PHY 240 to a byte stream which is then transmitted to an associated MAC interface 210. In the transmit mode, the PHY 240 converts a byte stream from an associated MAC interface 210 into the electrical or optical signal appropriate for the medium. The PHY 240 is particular to the type of medium to which it is connect.

The MAC processor 200 in the preferred embodiment comprises one or more MAC interfaces 210 compliant with the IEEE standard 802.3, hereby incorporated by reference. The MAC interfaces 210, operating at layer two defined in the OSI reference model, perform conventional network interface functions including the reception and transmission of Ethernet frames. In reception mode, the MACs 210 preferably perform various functions including: (a) MAC frame parsing for extracting from the Ethernet Type/Length field, the encapsulated protocol type, the frame priority, the user priority of VLAN tagged frames, and the TOS byte of IP frames with precedence or DiffServ mapping; (b) error checking using the frame check sequence (FCS) value of received data as well as packet decapsulation; and (c) asymmetric and symmetric flow control including the acceptance of flow control frames to discontinue frame transmission or pause frame transmission by a network neighbor, for example. Frames from the MAC interfaces 210 then undergo local processing at the MAC preprocessor 220 before being transmitted to the network processor 130.

In the transmission mode, frames undergo local processing at the MAC postprocessor 230 prior to being transmitted to the MAC interfaces 210. Consistent with conventional media access controllers, the MAC interfaces 210 perform various functions including: (a) collision handling, (b) access control to the communications medium in accordance with the CSMA/CD transmission protocol, (c) frame check sequence (FCS) value generation, (d) encapsulation, and (e) transmit deferral, for example. In the preferred embodiment, the MAC interfaces 210 are adapted to independently support either 10, 100, or 1000 megabit per second throughput using Reduced Ten-Bit Interface (RTBI) or Reduced Gigabit Media Independent Interface (RGMII) types of interfaces.

Figure 3:
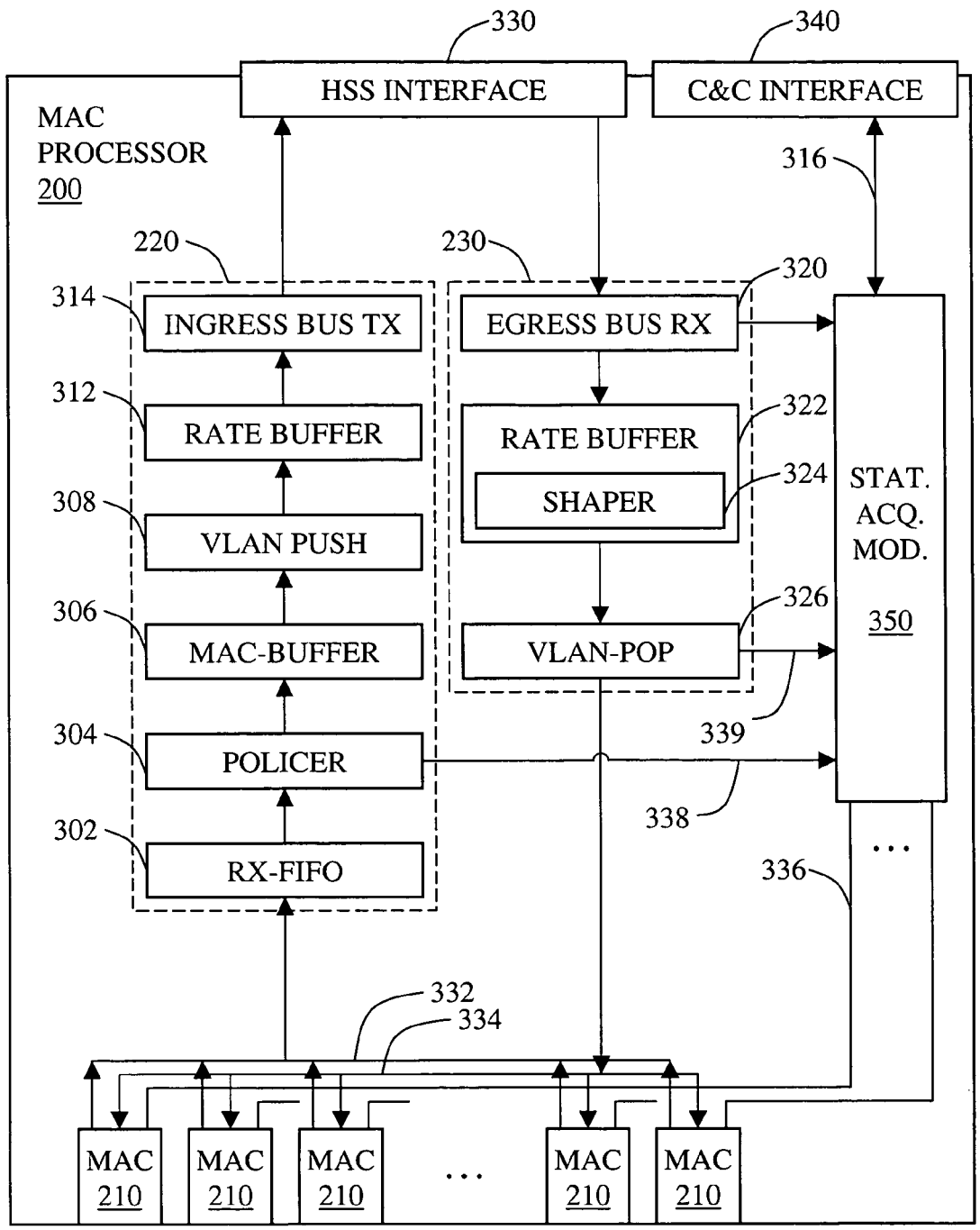
FIG. 3 is a functional block diagram of a Data Link Layer processor, according to the preferred embodiment of the present invention.

Illustrated in FIG. 3 is a functional block diagram of a MAC processor 200, according to the preferred embodiment of the present invention. In addition to one or more MACs 210, the MAC processor 200 in some embodiments includes a MAC preprocessor 220 and a MAC postprocessor 230. The MAC preprocessor 220 generally includes a traffic policer 304 for selectively filtering frames, a MAC buffer 306, a VLAN push module 308 for appending VLAN tags to selected inbound frames, a rate buffer 312, and an ingress bus transmitter 314 for conveying the frames to the network processor 130. The MAC postprocessor 230 preferably includes an egress bus receiver 320, a rate buffer 322 adapted further shape the egress traffic, and a VLAN pop module 326 for removing VLAN tags to selected inbound frames.

Ingress frames are transmitted from the plurality of MACs 210 to one or more receiver buffers via the internal ingress bus 332. The one or more receiver buffers, represented by receiver first-in-first-out (FIFO) memory 302, are used to buffer frame segments before the frame is transmitted to the traffic policer 304 or other downstream processing entity.

The traffic policer 304 of the preferred embodiment is adapted execute ingress traffic policy and frame discard locally prior to transmission to the network processor 130. In the preferred embodiment, the policer 304 employs a Three Color Marker (TCM) algorithm to identify frames for discard based upon criteria retained at or otherwise accessible by the policer 304. Policing locally at each of the plurality or AMs 102 replaces, reduces, or augments the policing function conventionally implemented in the network processor 130.

Figure 4:
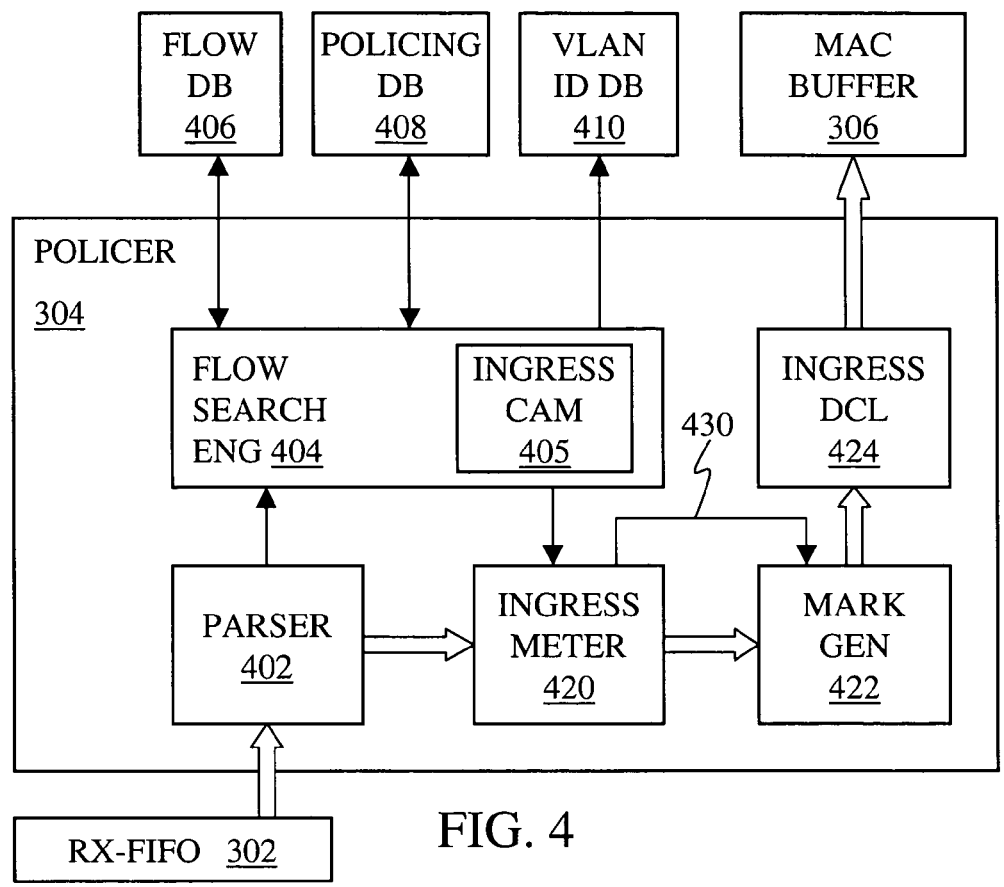
FIG. 4 is a functional block diagram of an integral traffic policer employed by the Data Link Layer processor, according to the preferred embodiment of the present invention
Figure 5:
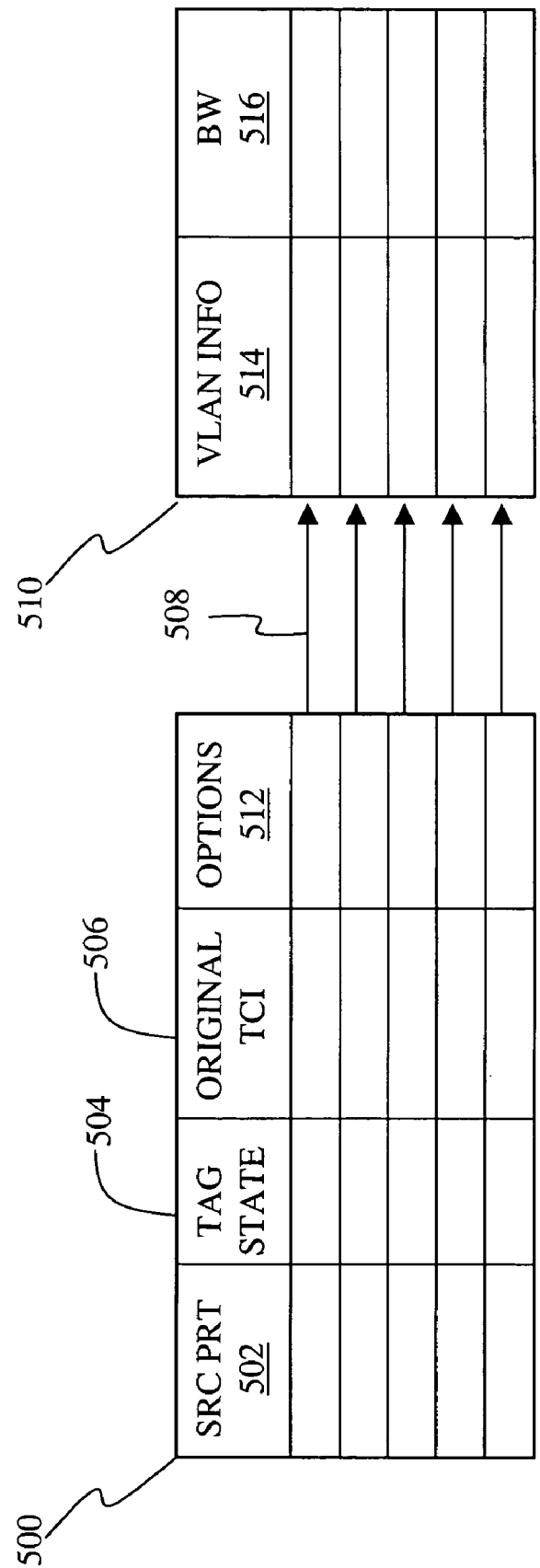
FIG. 5 is a schematic diagram of the flow database present employed by the Data Link Layer processor, according to the preferred embodiment of the present invention.

The traffic policer 304, illustrated in greater detail in FIG. 4, preferably comprises a first parser 402, a flow search engine (FSE) 404 with ingress CAM 405, an ingress meter module 420, a mark generator 422, and an ingress discard control logic 424. An ingress frame received from a MAC 210 via the receiver FIFO 302 is inspected by the parser 402 and one or more bits or fields extracted to form an index into the ingress CAM 404 where the search is preferably conducted. In the preferred embodiment, the CAM index comprises the source port 502, the VLAN tag state 504 indicating the presence or absence of an 802.1Q tag, and the original frame tag control information (TCI) field 506, which are illustrated schematically in the tabular form of ingress CAM table 500 of FIG. 5. In some embodiments, the ingress CAM index further comprises an Options field 512 to refine the search by selectively enabling or disabling one or more CAM search parameters using the following properties:

VLAN ID enable bit to selectively enable the search using the VLAN ID field of the ingress frame;

TCI enable bit to selectively enable the search using the tag control information of the ingress frame;

Source Port enable bit to selectively enable the search using the source port associated with the ingress frame;

Trusted/Untrusted port bit, from the TCI from outer VLAN tag of ingress frame, to selectively enable the search using the priority of the ingress frame; and Ethertype enable bit to selectively enable the search using the Ethertype (VLAN protocol identifier=x8100 or other) of the ingress frame.

If a match is detected, the FSE 404 retrieves a flow index 508 that points into the flow database 406 where various flow processing parameters are retrieved. As represented schematically by the tabular form 510 of the flow database 406 illustrated in FIG. 5, the FSE 404 retrieves from the flow database 406 one or more forms of processing information including VLAN information 514 to support VLAN tagging and bandwidth parameters to support flow control. The VLAN information 514 may include, but is not limited to, a new VLAN tag, a new VLAN ID for an existing tag, and a new TCI for an existing tag. In the preferred embodiment, the flow database 406 further includes an index into the policing database 408 pointing to one or more bandwidth parameters, e.g., TCM traffic parameters, necessary to police the ingress traffic flow.

In the preferred embodiment, the traffic policer 304 employs a TCM algorithm to selectively identify and discard out-of-profile frames, preferably a single rate Three Color Marking (srTCM) algorithm or the two rate Three Color Marking (trTCM) algorithm. The first, srTCM, is defined in Internet Engineering Task Force (IETF) Request for Comment (RFC) 2697, while trTCM is defined in IETF RFC 2698, both of which are hereby incorporated by reference herein. Either TCM algorithm described in these standards may be used alone or in combination to augment other decision-making processes in the switching device 100 responsible for determining if packets are out-of-profile and thus when to discard packets.

Referring to FIG. 4 again, to execute the srTCM algorithm, the policer 304 includes an ingress meter module (IMM) 420 to measure how much data is flowing per given unit time, which is indicated by the flow rate result 430 transmitted to the marker generator 422. Based on that measurement, the marker generator 422 classifies the frame into one of three categories referred to by those skilled in the art as "colors," namely green, yellow, and red. The color associated with a frame is determined as a function of traffic parameters defined for each of the flows. The traffic parameters in srTCM include a committed information rate (CIR) and two associated burst sizes, namely a committed burst size (CBS) and an excess burst size (EBS), all of which were retrieved from the policing database 408 as a function of the particular flow.

In general, the marker generator 422 evaluates the flow in accordance with srTCM to determine which mark to apply. If the frame does not exceed the CBS, a green marker is applied to indicate that the frame should be delivered to the next downstream process after the policer 304. A frame that is part of a flow that exceeds both the CIR and EBS is marked red and immediately discarded. If the frame exceeds the CBS but not the EBS, a yellow marker is associated with the frame to signify that the frame may be delivered as long as there are system resources or queuing resources to do so. The frame may be marked using a protocol-specific field or non-protocol marking when not supported by the protocol. Although a yellow frame may be discarded depending on the availability of system resources, it must always be dropped before a green frame is dropped. In the preferred embodiment, a discard control logic (DCL) units 424 is used downstream of marker generator 422 to inspect the marker on each frame and selectively drop the frame as needed as a function of systems resource, including congestion.

In the preferred embodiment, the CIR and EBS are implemented as bandwidth counters associated with a "Conform" bucket and an "Exceed" bucket, respectively. The maximum size of each counter is 256K bytes and is programmable by the network administrator. Each of the counters is "paid" with a programmable unit of tokens or bytes representing a quantity of bandwidth or the number of frames, for example. The tokens are "spent" by frames by deducting the length of the frame from the Conform bucket or the Exceed bucket, depending on the flow rate. In particular, the size of an inbound frame is compared to the accumulated pay in each counter. If the size is greater than the pay, the frame has "violated" the counter and needs to be marked. A frame that does not violate the Conform bucket is not marked and is enqueued into the global buffer, MAC buffer 306. Pay equal to the length of the frame is then reduced from the Conform counter. A frame that violates the Conform bucket is marked "yellow" and then enqueued into the buffer. Pay equal to the length of the frame is then reduced from the Exceed counter. Frames that violate both the Conform bucket and the Exceed bucket are marked "red" and dropped.

At a periodic interval, the Conform bucket or the Exceed bucket are paid and the tokens replenished to a programmable maximum value. In the preferred embodiment, the two counters may be programmed with different values of pay, even though the increment is done at the same time interval. One skilled in the art will appreciate that the pay for the Conform bucket must always be less than the Exceed bucket pay, and that the Exceed bucket is paid only after the Conform bucket has maximum pay.

The Conform bucket controls the Committed Information Rate and the Exceed bucket controls the Peak Information Rate. Both the rates are programmable, have a granularity of 64 kbps and can range from 64 Kbps to 1 Gbps. The frames marked red are dropped in the MAC preprocessor 220. The frames marked yellow are preferably carried through on the high speed serial interface 330 to the network processor 130.

In addition to the TCM traffic parameters used to implement policing, the FSE 404 also retrieves one or more VLAN identifiers applicable to the inbound frame. In the preferred embodiment, the one or more VLAN identifiers are derived from a tag options field in the VLAN information field 514 of the table 510 of the flow database 406. Once the applicable VLAN tag is identified, the VLAN tag is written to VLAN ID database 410 where it is made available to the VLAN push module 308 for purposes of performing 802.1Q VLAN tagging.

The policer 304 then transmits frames passed by the ingress DCL 424 to the MAC buffer 306. The MAC buffer 306 includes a global 512 kilobyte buffer that is shared by the twelve receive MAC interfaces 210. The 512 kilobyte buffer is split into 8192 chunks of 64 bytes. In general, the frames read from the different MAC interfaces 210 are stored into the receive buffer in their order of arrival.

In the preferred embodiment, the MAC preprocessor 200 may be implemented in an oversubscribed environment where the collective input of the MAC preprocessor 200 from the MAC interfaces 210 exceeds the capacity of the MAC processor 200 to transmit them to the network processor 130. As such, one or more frame discard algorithms are employed to drop all incoming frame when the MAC buffer 306 is full. The discard algorithms may be employed to drop frames based upon various factors including the priority of the inbound packet as taught in U.S. patent application Ser. No. 10/068,710. The inbound frames are discarded if at least one 64 bytes chunk the MAC buffer 306 is not free.

In the preferred embodiment, the frame discard algorithms are implemented at four levels:
- at the frames parser 402 level preceding the MAC buffer 306;
- at MAC buffer 306 input via a protocol CAM (not shown) and frame priority descriptors;
- at MAC buffer 306 write time using Weighted Early Random Discard (WRED) or FIFO thresholds, i.e. "watermarks," that trigger frame discard at a plurality of MAC buffer 306 FIFOs, each FIFO being associated with priority for one of the twelve ports; and
- at MAC buffer 306 read time via a class-based, i.e. priority-based, FIFO dequeueing algorithm.

One skilled in the art will appreciate that in an oversubscribed environment, the presence of the traffic policer 304 is particularly important since it provides an intelligent way to discard the frames early and prevents out-of-profile frames from needlessly consuming the resources and memory in the MAC buffer 306. By eliminating offending frames prior to processing and buffering, the network processor 130 is relieved of the burden of processing the frames and the chance of discarding a valid frame due to the lack of available buffer space and other resources is minimized.

As the frames are released from the MAC buffer 306, individual frames are transmitted to the VLAN push module 308 where one or more VLAN tags are inserted into selected frames. In the preferred embodiment, the VLAN push module 308 retrieves the one or more VLAN IDs an or other VLAN information from the VLAN ID database 410, which were previously placed there by the FSE 404 after the frame was classified during the policing operation. The new VLAN tag information may be appended to the frame in the form of a new VLAN tag, or used to replace one tag information present in an existing VLAN tag. The manner in which the tags retrieved from the VLAN ID database 410 is to be used is determined by the tag option bits from the VLAN information field 514 of table 510. The frame check sequence (FCS) field is also modified to account for the length of the frame with the new tag.

In some alternative embodiments, the VLAN push module 308 includes a VLAN CAM adapted to identify the appropriate VLAN ID based upon a match of one or more frame fields including the source port and incoming VLAN tag, for example. The matching entry in the VLAN CAM then points to a new tag, which is then pushed onto the packet or used to replace an existing tag.

The VLAN pushing feature, which includes a VLAN stacking feature is adapted to store and utilize as many as 128 QoS rules/VLAN entries, although more are possible. In the preferred embodiment, approximately 128 VLAN entries retained at the MAC processor 210 generally represent a subset of all the QoS rules/VLANs supported by the switching device 100. The subset of QoS rules/VLANs supported by any given MAC processor 200 represent the minimal set of QoS rules/VLANs associated with traffic on the local MAC interface 210 while excluding QoS rules not relevant to the particular MAC processor. This provides at least two advantages. First, the depth of the CAM necessary to search for the applicable VLAN is smaller and, second, the local VLAN processing relieves the network processor of the responsibility of performing VLAN tagging and stacking.

From the VLAN push module 308, frames are passed to an ingress rate buffer 312 responsible for transmitting the frames at a relatively uniform rate to the high speed serial (HSS) interface 316 via an ingress data bus transmitter 314. The high speed serial (HSS) interface 316 operably couples the MAC preprocessor 220 to the network processor 130 by means a packet streaming bus, which is well known to those skilled in the art. The packet streaming bus may also operatively couple the network processor 130 to each of the plurality of MAC processors 200.

In addition to transmitting ingress traffic, each of the plurality of MAC processors 200 also receive egress traffic from the network processor 130. Egress traffic destined for a local PHY interface 240 port is received by the MAC postprocessor 230 at the egress bus receiver 320 via the HSS interface 330. The egress frames are temporarily buffered at the egress rate buffer 322 and subsequently transmitted at a relatively uniform rate to the VLAN pop module 326.

In some embodiments, the rate buffer 322 further includes a traffic shaper 324 adapted to perform bandwidth-based flow control for the egress traffic received by the MAC processor 200. The traffic shaper 324 in the preferred embodiment regulates the MAC postprocessor 230 output bandwidth using a single token bucket algorithm in conjunction with one or more buckets, each bucket being associated with a flow class. Tokens allotted to each bucket, tracked using a "conform counter," represent the capacity for each flow class. Each time a frame is transmitted from the rate buffer 322, a number of tokens representing the length of the frame is deducted from the associated conform counter. If there are not enough tokens to transmit the frame, transmission of the frame from the rate buffer is suspended until the tokens are subsequently replenished. Although the shaper 324 generally does not discard frames, suspension of the bucket for an extended period of time may result in the switch fabric (not shown) backing up and or the dropping of frames at an ingress switching device.

Frames associated with a flow class are transmitted once again after the tokens are replenished. In the preferred embodiment, the conform counters are paid a maximum number of tokens at a regular time interval, programmably determined by the network administrator. In the preferred embodiment, shaping may be based on port, VLAN, and priority, or any combination thereof.

Figure 6:
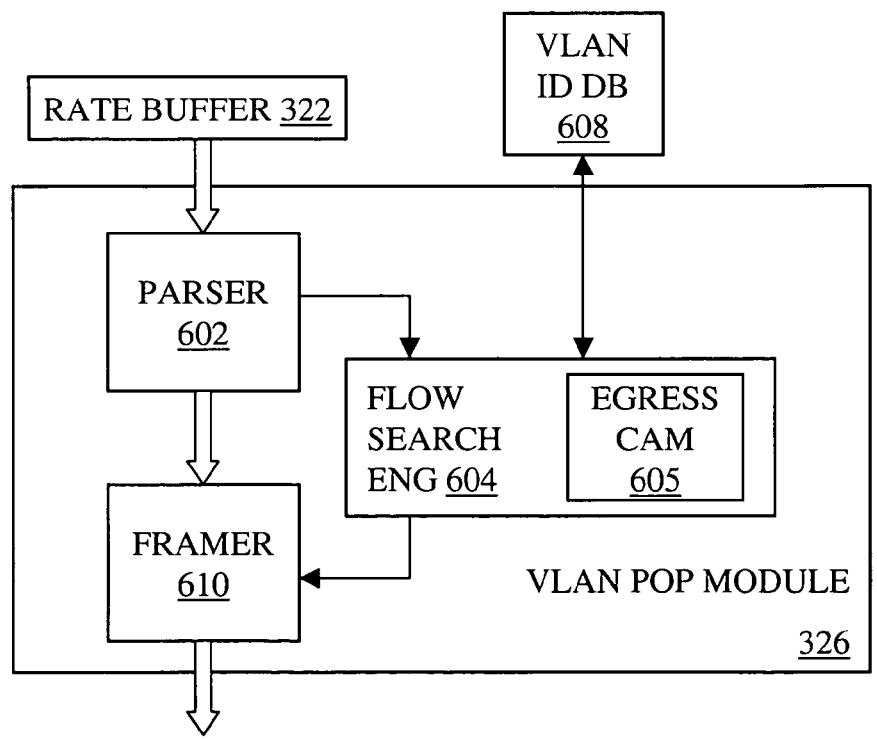
FIG. 6 is a functional block diagram of an integral VLAN pop module employed by the Data Link Layer processor, according to the preferred embodiment of the present invention.

The VLAN pop module 326 is adapted to remove an existing tag on an egress frame, or to replace VLAN tag information in an existing tag or a tag previously inserted at the VLAN push module 308 of the ingress switching device. The VLAN pop module 326 of the preferred embodiment, illustrated in FIG. 6, comprises a second parser 602 for extracting one or more bits or fields from the egress frame and an egress flow search engine 604 for generating a key into an egress CAM 605 which, if matched, yields a pointer to the VLAN identifier database 608. Included in the VLAN identifier database 608 are the VLAN association rules embodied in option bits providing instructions remove or replace one or more existing VLAN tags, if applicable. The VLAN tag processing instructions are conveyed to the framer 610 responsible for altering the frame prior to transmission to the appropriate MAC interface 210 via the egress bus 334. If applicable, a new CRC field is appended to the frame before it is sent out on the network.

The MAC postprocessor 230 of the preferred embodiment further includes a statistics acquisition module (SAM) 350 for compiling flow statistics from each of the MAC interfaces 210. In the preferred embodiment, statistics are collected on a per-port basis and or per-VLAN basis. As they are compiled, the statistics are transmitted by the SAM 350 to a central management entity present in the management module 150 or another location accessible to each of the one or more switching devices 100. If the SAM 350 is enabled with a simple network management (SNMP) client, the central management entity may periodically download the statistics using SNMP messages conveyed via the command and control interface 340.

The statistics collected in the preferred embodiment include the total set of Remote Monitoring (RMON) and Managed Information Base (MIB)-II statistic from each of the plurality of MACs 210 via the first statistics channel 336. RMON is set forth in a plurality of Request For Comment (RFC) known to those skilled in the art, while MIB-II is set forth in RFC 1213 entitled, "Management Information Base for Network Management of TCP/IP-based internets." In the preferred embodiment, SAM 350 further collects statistics necessary to implement QoS features such as VLAN statistics and statistics relevant to Switch Monitoring (SMON) conformance, the SMON requirements being set forth in Internet Engineering Task Force (IETF) Request For Comment (RFC) 2613, entitled "Remote Network Monitoring MIB Extensions for Switched Networks," hereby incorporated by reference herein.

The VLAN statistics are preferably collected on a per-VLAN entry basis for the ingress stream by way of the ingress FSE 404 and egress stream by way of egress FSE 604, as illustrated by ingress statistics channel 338 and egress statistics channel 339, respectively. With respect to the ingress traffic, the SAM 350 collects the following statistics, per VLAN entry supported by the MAC preprocessor 220:

Number of bytes enqueued at the MAC buffer 306;
Number of packets enqueued at the MAC buffer 306;
Number of bytes discarded bytes by the traffic policer 304;
Number of packets discarded by the traffic policer 304;
Number of non-unicast bytes enqueued at the MAC buffer 306;
Number of non-unicast packets enqueued at the MAC buffer 306;
Number of non-unicast bytes discarded by the traffic policer 304; and
Number of non-unicast packets discarded by the traffic policer 304.

With respect to the egress traffic, the SAM 350 preferably collects and compiles statistics per-port and per-VLAN entry. The statistics acquired are subdivided into the number of dequeued bytes and the number of dequeued packets, for example. If the frame includes a plurality of VLAN tags, the statistics are accumulated on the outer tag.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A switching device comprising:
one or more physical layer interfaces for receiving one or more frames from a communication network;
a plurality of data link layer processors being coupled to operate in parallel, wherein each data link layer processor comprises:
one or more media access controllers (MACs), wherein each MAC is operatively coupled to a physical layer interface, each of said one or more MACs includes a MAC preprocessor and a MAC postprocessor, said MAC preprocessor including a traffic policer, said traffic policer adapted to execute an ingress traffic policy and frame discard, said traffic policer utilizing a three color marker algorithm to identify frames for discard, wherein the MAC postprocessor includes a traffic shaper adapted to perform bandwidth-based flow control for the egress traffic received by at least one of said MACs, wherein the traffic shaper regulates output bandwidth of the MAC postprocessor using a token bucket algorithm in conjunction with one or more buckets each associated with a respective one of a plurality of flow classes, and wherein tokens allotted to each bucket and tracked using a first counter represent a capacity for each one of said flow classes; and
a statistics acquisition module, operatively coupled to the one or more MACs, for compiling statistics on each of the plurality of MACs; and
a network processor, operatively coupled to the plurality of data link layer processors, for routing the one or more frames received from the plurality of data link layer processors.

2. The switching device of claim 1, wherein each of the data link layer processors further comprises one or more flow search engines for classifying the one or more frames based upon one or more properties associated with the frames.

3. The switching device of claim 2, wherein one or more properties comprise a source port, a VLAN tag state, a VLAN identifier, and a VLAN tag control information (TCI) field.

4. The switching device of claim 2, wherein the one or more flow search engines comprise one or more content addressable memories (CAMs).

5. The switching device of claim 4, wherein the one or more CAMs associated with each of the plurality of data link layer processors consists of QoS rules pertaining to the associated plurality of physical layer interfaces.

6. The switching device of claim 1, wherein data link layer processors are media access controller (MAC) processors.

7. The switching device of claim 1, wherein the switching device is selected from the group consisting of: a router, a multi-layer switching device, and a switch blade.

8. The switching device of claim 1, wherein the statistics compiled by the statistics acquisition module comprise ingress frame statistics.

9. The switching device of claim 8, wherein the ingress frame statistics are compiled as a function of VLAN entry.

10. The switching device of claim 9, wherein the ingress frame statistics compiled as a function of VLAN entry comprise:
the number of bytes enqueued at the data link layer processor;
the number of frames enqueued at the data link layer processor;
the number of non-unicast bytes enqueued at the data link layer processor; and
the number of non-unicast frames enqueued at the data link layer processor.

11. The switching device of claim 1, wherein the statistics compiled by the statistics acquisition module comprise egress frame statistics.

12. The switching device of claim 11, wherein egress frame statistics are compiled as a function of physical layer interface.

13. The switching device of claim 12, wherein egress frame statistics are further compiled as a function of VLAN entry.

14. The switching device of claim 1, wherein said MAC preprocessor includes at least one of a MAC buffer, a VLAN push module, a rate buffer, and an ingress bus transmitter.

15. The switching device of claim 1, wherein said MAC postprocessor includes at least one of an egress bus receiver, a rate buffer, and a VLAN pop module.

16. The switching device of claim 1, wherein said traffic policer includes a parser for inspecting the received one or more frames.

17. The switching device of claim 16, wherein said traffic policer includes a flow search engine for classifying the one or more frames based upon one or more properties associated with the frames.

18. The switching device of claim 17, wherein the flow search engine comprises content addressable memories (CAMs).

* * * * *